(12) United States Patent
Miura et al.

(10) Patent No.: US 7,078,884 B2
(45) Date of Patent: Jul. 18, 2006

(54) POWER SUPPLY APPARATUS AND CONTROL CIRCUIT THEREFOR

(75) Inventors: Koichiro Miura, Tokyo (JP); Takeshi Uematsu, Tokyo (JP); Hiroshi Kawasaki, Tokyo (JP); Takakazu Imai, Tokyo (JP); Ken Matsuura, Tokyo (JP)

(73) Assignee: TDK Corporation, Tokyo (JP)

( * ) Notice: Subject to any disclaimer, the term of this patent is extended or adjusted under 35 U.S.C. 154(b) by 281 days.

(21) Appl. No.: 10/811,968

(22) Filed: Mar. 30, 2004

(65) Prior Publication Data

US 2004/0189266 A1    Sep. 30, 2004

(30) Foreign Application Priority Data

Mar. 13, 2003   (JP) .............................. 2003-096916

(51) Int. Cl.
  *G05F 1/59*     (2006.01)
  *H02M 3/158*    (2006.01)

(52) U.S. Cl. ...................... 323/272; 323/284; 323/351; 363/65

(58) Field of Classification Search ................ 323/271, 323/272, 282, 284, 351; 363/65
See application file for complete search history.

(56) References Cited

U.S. PATENT DOCUMENTS 6,150,803 A * 11/2000 Varga .......................... 323/282
6,346,798 B1 * 2/2002 Passoni et al. ............... 323/272
6,476,589 B1 * 11/2002 Umminger et al. .......... 323/282
6,674,274 B1 * 1/2004 Hobrecht et al. ............ 323/285
6,696,882 B1 * 2/2004 Markowski et al. ........ 327/531
6,771,052 B1 * 8/2004 Ostojic ........................ 323/266
6,836,103 B1 * 12/2004 Brooks et al. ............... 323/282
7,002,324 B1 * 2/2006 Uematsu et al. ............. 323/272
7,002,325 B1 * 2/2006 Harris et al. ................. 323/272

FOREIGN PATENT DOCUMENTS

| JP | A-56-012491   | 7/1954 |
| JP | A 7-203672    | 8/1995 |
| JP | A-07-203672   | 8/1995 |
| JP | A-11-113251   | 4/1999 |
| JP | A-2000-173794 | 6/2000 |
| JP | A-2002-044941 | 2/2002 |

* cited by examiner

*Primary Examiner*—Jeffrey Sterrett
(74) *Attorney, Agent, or Firm*—Oliff & Berridge, PLC

(57) ABSTRACT

A selector sets respective phases of pulse driving signals in reverse when a proportion signal or integration signal does not exceed a threshold. Shifting the respective phases of the pulse driving signals from each other lowers the ripple voltage. When the load current increases drastically, the output voltage Vo tends to decrease remarkably because of the shortage of capacity in the power supply. In this case, when the proportion signal or integration signal exceeds its corresponding threshold, a phase control unit causes the pulse driving signals to synchronize their phases, i.e., the selector supplies the same ramp wave to the comparators, so that respective output voltages supplied from the DC voltage converter circuits attain the same phase, thereby restraining the output voltage supplied to the load from decreasing remarkably.

3 Claims, 3 Drawing Sheets

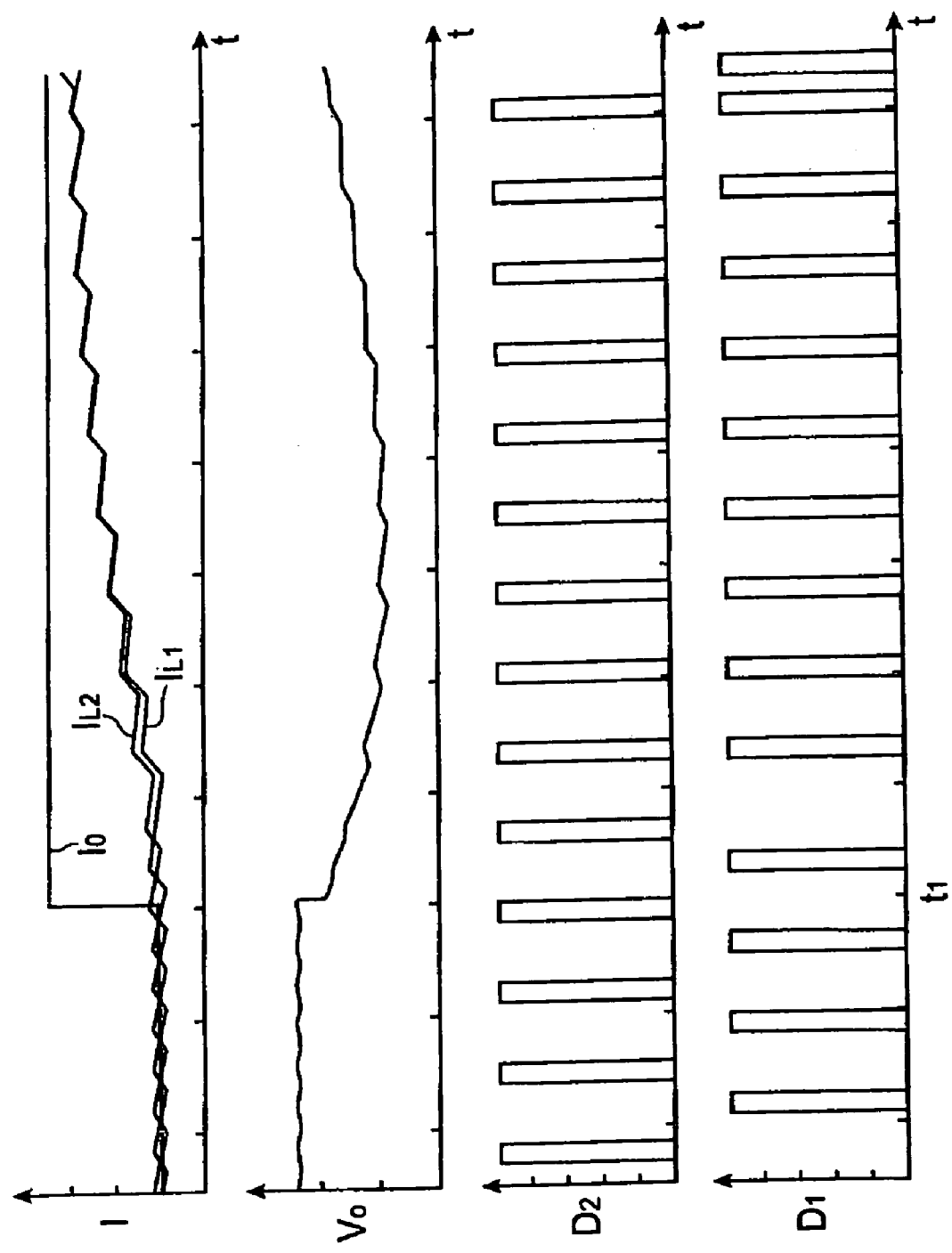

POWER SUPPLY APPARATUS AND CONTROL CIRCUIT THEREFOR

BACKGROUND OF THE INVENTION

1. Field of the Invention

The present invention relates to a power supply apparatus comprising a plurality of power converter circuits connected in parallel, and a control circuit therefor.

2. Related Background Art

As a conventional switching power supply apparatus, one disclosed in Japanese Patent Application Laid-Open No. HEI 7-203672 has been known, for example. In a power supply apparatus employing a PWM control scheme which carries out voltage control for causing an actual output voltage value to coincide with a target voltage value, the switching power supply apparatus disclosed in the reference uses different output voltage controlling parameters for a start up period to the target voltage value and for a steady state after the target voltage value is attained, thereby providing a power supply apparatus which is excellent in start up period and steady-state characteristics.

As the processing in microprocessors and digital signal processing (DSP) circuits mounted in personal computers, communication devices, and the like has become faster, the power consumption in such a device has been lowered. As a result, the voltage applied to integrated circuits (operating voltage) has become lower, thus requiring precision power management in conformity to operating states.

SUMMARY OF THE INVENTION

In a control system of a switching power supply, however, the output response and the stability of the control system are contradictory to each other. When the gain of the control system is enhanced in order to reduce the response time, the output voltage is more likely to oscillate. When the gain is lowered, by contrast, the response deteriorates, though the stability of the control system can be secured. For example, when a processor acting as a load shifts from a so-called sleep mode to an active mode, so that the load current increases drastically, the output voltage cannot follow the drastic increase in load current, whereby the output voltage may be in a lowering. When the load current decreases drastically, by contrast, the output voltage may become in over voltage. If a plurality of capacitors are used in the output stage in order to prevent such a phenomenon from occurring, the apparatus will increase its size.

In view of such problems, it is an object of the present invention to provide a power supply apparatus which favorably follows the load current without losing the stability of the control system and is excellent in the stability of output voltage, and a control apparatus therefor.

For overcoming the above-mentioned problems, the present invention provides a control apparatus for a power supply apparatus comprising a plurality of power converter circuits connected in parallel; each power converter circuit comprising a switch circuit for forming a pulse-like waveform by switching an inputted power according to a pulse driving signal, and a smoothing circuit for converting the pulse-like waveform into a direct current and outputting the direct current; the control apparatus comprising a feedback control unit for changing, according to a magnitude of an arithmetic value summing a proportion signal in proportion to a deviation of an output voltage of the power converter circuit from a reference voltage and an integration signal integrating the deviation, a duty ratio of the pulse driving signals applied to switching devices of the power converter circuits; and a phase control unit for causing the pulse driving signals to synchronize phases thereof when the proportion signal or integration signal exceeds a threshold thereof.

This control apparatus applies a pulse driving signal to a switching device of a power converter circuit, whereby an output voltage occurs between output terminals according to the duty ratio of the pulse driving signal. Since a plurality of such power converter circuits are connected in parallel with the load, each power converter circuit supplies a DC voltage to the load.

Here, the duty ratio is adjusted by using the proportion control and integration control in the feedback control unit. Namely, the feedback control unit changes duty ratios of pulse driving signals applied to switching devices of the power converter circuits according to the magnitude of an arithmetic value summing a proportion signal in proportion to a deviation of an output voltage of the power converter circuit from a reference voltage and an integration signal integrating the deviation.

Therefore, so-called PI control is executed. Here, a differential value of the deviation may be used as an additional arithmetic value, whereby so-called PID control is executed.

Shifting the respective phases of the pulse driving signals from each other can reduce the ripple voltage component in the voltage supplied from such a power supply apparatus to the load.

When the load current increases drastically, the decrease of output voltage tends to become remarkable unless the control system response to the drastic increase. Therefore, in the control apparatus of the present invention, the phase control unit causes the pulse driving signals to synchronize their phases when the proportion signal or integration signal exceeds a threshold thereof. The power converter circuits operating in synchronization with each other restrain the output voltage supplied to the load from decreasing remarkably.

Therefore, this control apparatus improves the responsibility to the load current, since the phase control unit carries out phase adjustment if the load increases, even when the gain of PI control unit is set so as to fully secure the stability of the control system.

The threshold to be compared with the proportion signal or integration signal may be changed by threshold changing means according to operation mode. This can adjust the switching power supply start up time and the output response, for example.

Such a power supply apparatus comprises the control circuit and a plurality of the power converter circuits connected in parallel and controlled by the control circuit, thus becoming a power supply apparatus which can favorably response the load current and is excellent in the stability of the system.

BRIEF DESCRIPTION OF THE DRAWINGS

FIG. 3A is a timing chart of the current I (load current Io and detected currents $I_{L1}$, $I_{L2}$) in the circuit shown in FIG. 2.

FIG. 3B is a timing chart of output voltage Vo in the circuit shown in FIG. 2.

FIG. 3C is a timing chart of pulse driving signal $D_2$ in the circuit shown in FIG. 2.

FIG. 3D is a timing chart of pulse driving signal $D_1$ in the circuit shown in FIG. 2.

DESCRIPTION OF THE PREFERRED EMBODIMENT

In the following, the control apparatus for switching power supply apparatus and the switching power supply apparatus in accordance with embodiments will be explained with reference to the drawings.

Figure 1:
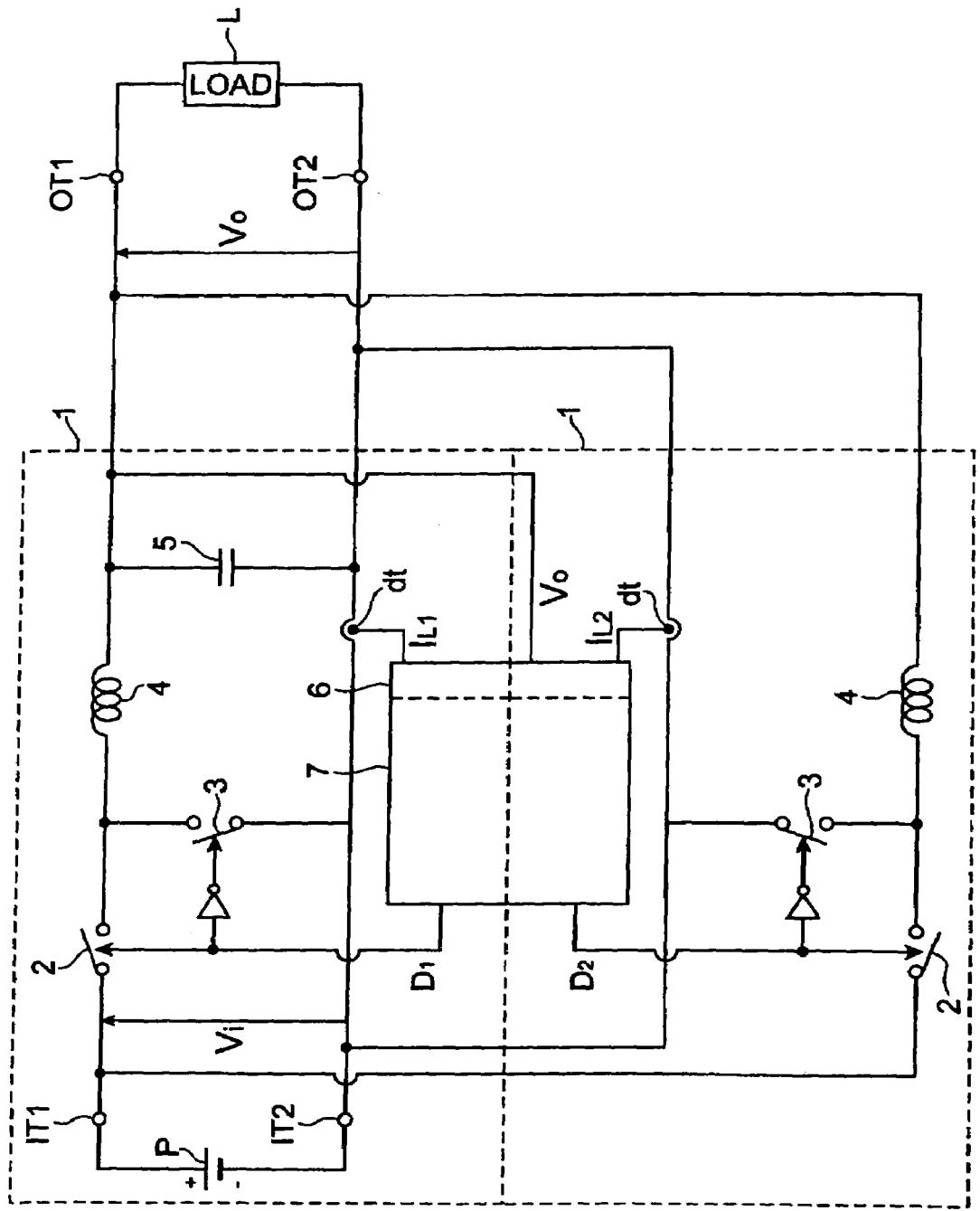
FIG. 1 is a block diagram showing a power supply apparatus comprising a plurality of switching power supplies 1 connected in parallel.

FIG. 1 is a block diagram of a power supply apparatus comprising a plurality of switching power supplies 1 arranged in parallel.

Each switching power supply 1 includes a pair of input terminals IT1, IT2 to which a DC voltage Vi is applied, and a pair of output terminals OT1, OT2 which are connected to a load L. One of the two input terminals IT1, IT2 is grounded, whereas the other is connected to one of potentials of a DC voltage source P. The load L is connected between the two output terminals OT1, OT2. These input and output terminals constitute a four-terminal circuit.

The load L is a destination to which an output voltage Vo output from the switching power supply 1 is fed. Examples of the load L include CPU (Central Processing Unit) and MPU (Micro Processing Unit) used in PC terminals and the like. Such CPU and MPU have a power-saving mode, and are characterized in that load fluctuations drastically increase when shifting from the power-saving mode to a normal mode.

The switching power supply 1 is a noninsulated step-down DC/DC converter which converts a higher DC input voltage Vi into a lower output voltage Vo. A controller IC (control unit) 7 for carrying out voltage control generates pulse driving signals (PWM signals) D ($D_1$, $D_2$) according to the output voltage Vo converted into a digital value by an A/D converter 6, and applies the PWM signals D to switching devices 2, 3 of their corresponding DC voltage converter circuits (power converter circuits).

The switching device 2 has one end connected to an input terminal, and the other end connected to a coil 4. The switching device 3 has one end connected to the switching device 2, and the other end connected to the ground. The conducting/non-conducting of the switching devices 2, 3 is regulated according to inputs of the PWM signals D. Fed into the switching device 3 is a pulse driving signal complementary to the PWM signal D inputted to the switching device 2, whereby the switching device 3 is non-conducted and conducted when the switching device 2 is short-circuited and opened, respectively. As the switching devices 2, 3, bipolar transistors and field-effect transistors can be employed.

The coil 4 is connected in series between the output terminal OT1 and the junction between the switching devices 2, 3, whereas a capacitor 5 is connected between the output terminals. The coil 4 and capacitor 5 constitute a smoothing circuit, which is disposed downstream the switching devices 2, 3 and smoothes the pulse voltage generated by ON/OFF of the switching devices 2, 3, thereby converting it into a DC voltage.

The output voltage Vo becomes higher as the pulse width of PWM signal D, i.e., the time during which the switching device 2 is ON (duty ratio), increases.

The smoothing circuit is provided with a detecting device (detecting unit) dt for detecting the current (=output current) flowing through the circuit. The detecting device dt is a hole sensor, for example. The detected current $I_L$ (of which respective detected currents of the switching power supplies will be referred to as $I_{L1}$, $I_{L2}$) and output voltage Vo are converted into digital values by the A/D converter 6, and thus obtained digital values are fed. into the controller IC (control unit) 7. The controller IC can be realized by an analog/digital mixed signal IC.

Namely, according to the digital input information $I_L$ ($I_{L1}$, $I_{L2}$) and Vo, the controller IC 7 generates the PWM signals D ($D_1$, $D_2$).

Figure 2:
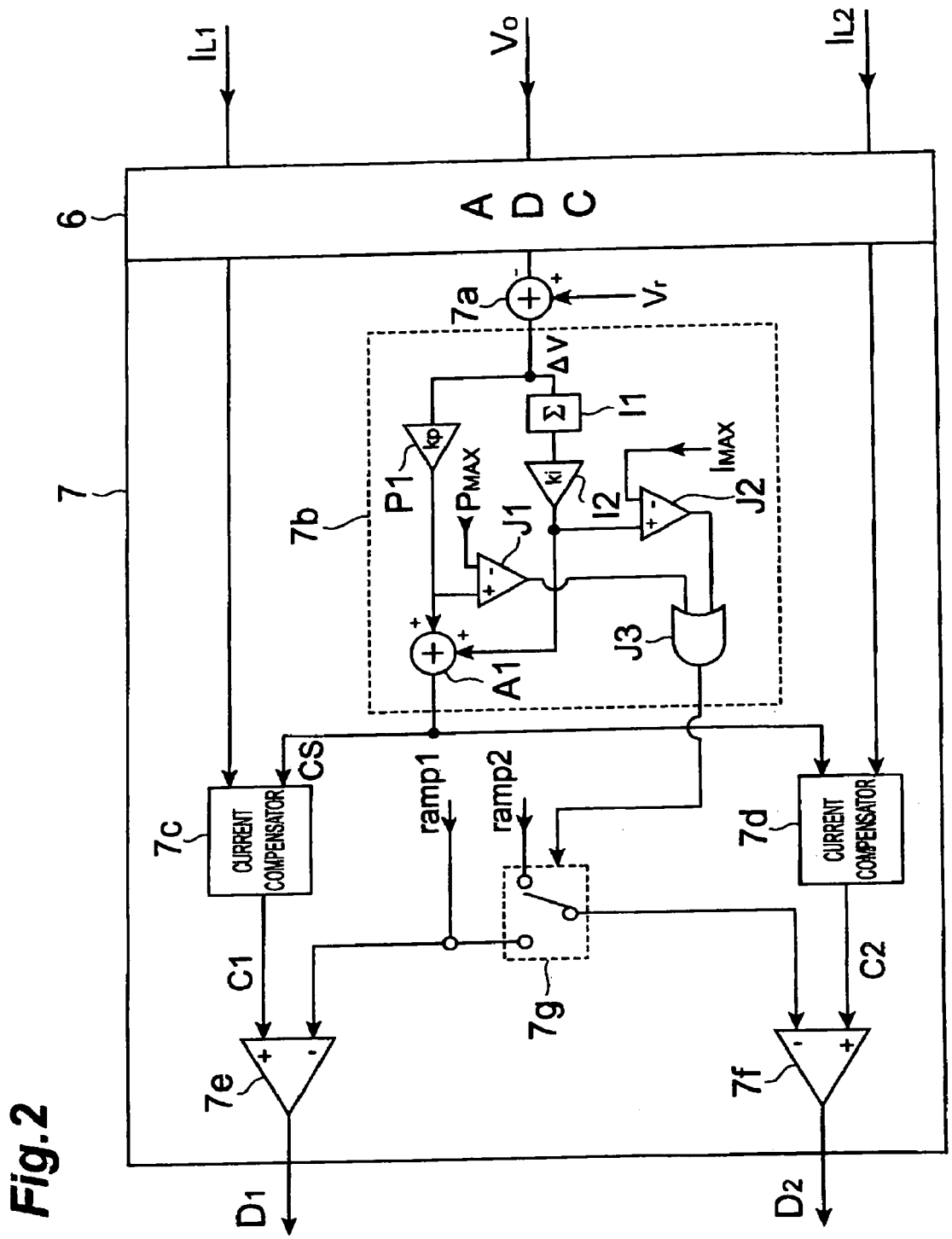
FIG. 2 is a block diagram showing the inner configuration of a controller IC 7.

FIG. 2 is a block diagram showing the inner configuration of the controller IC 7.

The controller IC 7 comprises an adder 7a for outputting a deviation $\Delta V$ (=Vr−Vo) of the output voltage Vo from the reference voltage Vr, a PI control unit 7b for receiving the deviation $\Delta V$ output from the adder 7a, a current compensator 7c for receiving a deviation-dependent arithmetic value CS output from the PI control unit 7b together with the current $I_{L1}$, a current compensator 7d for receiving the arithmetic value CS together with the current $I_{L2}$, a comparator 7e for receiving a deviation-dependent arithmetic value C1 output from the current compensator 7c and a first ramp wave (ramp1), and a comparator 7f for receiving a deviation-dependent arithmetic value C2 output from the current compensator 7d and the first or second ramp wave (ramp1, ramp2).

The controller IC 7 also comprises a selector 7g which switches between the ramp waves to be fed into the comparator 7f in response to the output of the PI control unit 7b. The phase of the first ramp wave (ramp1) shifts from that of the second ramp wave (ramp2) by 180° (i.e., their phases are in reverse).

The PI control unit 7b is a major part of feedback control, which subjects the deviation $\Delta V$ to the following processing and outputs thus processed deviation to the current compensators 7c, 7d.

The feedback control is control in which, in order for a target reference voltage Vr and an output voltage Vo of the system to coincide with each other, the deviation $\Delta V$ (=Vr−Vo) of the output voltage Vo from the reference voltage Vr is subjected to appropriate processing and then is fed back to an input. Known as control schemes in the feedback control are P (proportion) control, I (integration) control, D (differentiation) control, and so forth.

For the P control, the PI control unit 7b comprises an amplifier P1 for multiplying the deviation $\Delta V$ by a constant of proportion kp and outputting the result. The resulting arithmetic value $kp \times \Delta V$ becomes greater as the output voltage Vo is lower, i.e., the deviation $\Delta V$ is greater. As the deviation $\Delta V$ is greater, the time interval given by the arithmetic value $kp \times \Delta V$ and the ramp wave becomes longer, i.e., the duty ratio of the pulse driving signal increases, whereby the output voltage Vo becomes higher. In other words, when the output voltage Vo decreases along with the increase in load current, the output voltage Vo tends to increase under the P control and thus is restrained from decreasing.

For the I control, the PI control unit 7b further comprises an integrator I1 for integrating (accumulating) the deviation $\Delta V$, and an amplifier I2 for multiplying the integrated deviation ($\int \Delta V dt$) by a constant of proportion ki and outputting the resulting arithmetic value ($ki \times \int \Delta v dt$).

The I control can improve disturbance eliminating performances in low frequency bands, and thus can reduce steady-state deviations when combined with the P control.

The D control is control setting a term in proportion to the differential value of the deviation $\Delta V$, and has been known as a control scheme which improves both the response speed and the stability of the system when combined with the PI control so as to effect PID control. A general expression of the PID control is given by $$CS = Kp \times \Delta V + Ki \times \int \Delta V dt + Kd \times d\Delta V/dt$$

where Kp is a feedback gain (proportion element), Ki is a feedback gain (integration element), and Kd is a feedback gain (differentiation element).

Since this example illustrates the PI control, the differential term in the expression of CS will be neglected. Namely, the PI control unit 7b comprises an adder A1 for adding the arithmetic value (Kp×ΔV) of P control and the arithmetic value (Ki×∫ΔVdt) of I control. The arithmetic value CS output from the adder is fed into the current compensators 7c, 7d. As mentioned above, the response speed becomes faster as the feedback gain Kp is made greater, whereas steady-state deviations become smaller as the feedback gain Ki is made greater. When the feedback gains are too large, however, the control system becomes unstable, and the output voltage oscillates. Therefore, the feedback gains are set such that the stability of the system can fully be secured.

The current compensators 7c, 7d are subtractors, for example, and enhance the accuracy of feedback control according to actually measured magnitudes of output currents $I_{L1}$, $I_{L2}$.

The arithmetic value C1 (or CS) output from the current compensator 7c and the first ramp wave (ramp1) are fed into the comparator 7e. The comparator 7e outputs H and L levels when the arithmetic value C1 is greater than the first ramp wave (ramp1) and not, respectively. Namely, the duty ratio of the pulse driving signal $D_1$ generated by this level fluctuation is in proportion to the arithmetic value C1 (or CS).

The arithmetic value C2 (or CS) output from the current compensator 7d and the first or second ramp wave (ramp1, ramp2) are fed into the comparator 7f. The comparator 7f outputs H and L levels when the arithmetic value C2 is greater than the ramp wave and not, respectively. Namely, the duty ratio of the pulse driving signal $D_2$ generated by this level fluctuation is in proportion to the arithmetic value C2 (or CS).

More specifically, the feedback control unit constituted by the elements 7a, 7b, 7e, 7f changes duty ratios of the pulse driving signals $D_1$, $D_2$ applied to the switching devices 2, 3 of the DC voltage converter circuits according to the magnitude of arithmetic value CS summing the proportion signal in proportion to the deviation ΔV of the output voltage Vo between the output terminals from the reference voltage Vr and the integration signal integrating the deviation ΔV.

When the pulse driving signals $D_1$, $D_2$ are applied to the switching devices 2, 3 of the DC voltage converter circuits, the output voltage Vo occurs between the output terminals according to the duty ratios of the pulse driving signals $D_1$, $D_2$. Since a plurality of such DC voltage converter circuits are connected in parallel with the load L, each DC voltage converter circuit supplies a DC voltage to the load L.

Here, the first or second ramp wave is selected by the selector 7g. The PI control unit 7b determines a selecting criterion for the selector 7g.

Namely, the PI control unit 7b comprises comparators J1, J2 for determining whether or not the proportion signal (kp×ΔV) and integration signal (ki×∫ΔVdt) are greater than their thresholds PMAX and IMAX, respectively; and an OR circuit J3 which outputs an H level when the result of determination of any of the comparators J1, J2 is greater than its corresponding threshold. The selector 7g selectively feeds the first ramp wave (ramp1) and second ramp wave (ramp2) into the comparator 7f when the H and L levels are output from the OR circuit, respectively.

Namely, the determining sections J1, J2, J3 and selector 7g constitute a phase control unit which causes the pulse driving signals $D_1$, $D_2$ to synchronize their phases when any of the signal (kp×ΔV) and integration signal (ki×∫ΔVdt) is greater than its corresponding threshold PMAX, IMAX.

When the proportion signal or integration signal does not exceed its corresponding threshold, the selector 7g sets the respective phases of the pulse driving signals $D_1$, $D_2$ in reverse to each other. Shifting the phases of the pulse driving signals from each other is also advantageous in that the ripple voltage is lowered in the voltage supplied to the load L.

When the load current increases drastically, the feedback gain set by the PI control unit may fail to follow the drastic change, thereby remarkably lowering the output voltage Vo. In this case, the proportion signal or integration signal of the phase control unit exceeds its corresponding threshold, whereby the phases of the pulse driving signals coincide with each other. Namely, the selector 7g supplies the same ramp wave (ramp1) to the comparators 7e, 7f, so that the respective output voltages supplied from the DC voltage converter circuits have the same phase, thereby restraining the output voltage supplied to the load L from decreasing remarkably.

As explained in the foregoing, the controller IC 7 and the power supply apparatus regulated thereby improve the followability to the load current without making the control system unstable, thus achieving an excellent stability in output voltage.

The respective thresholds to be compared with the proportion signal and integration signal can be made variable in response to operating states. An example of threshold changing means is a switch or the like which changes the thresholds in response to an input from a user. In other words, the thresholds are variable. This can adjust the start up time for the power supply apparatus, for example. From the instant at which the DC voltage Vi is applied upon connection with the DC voltage source P until the output voltage attains a steady state (the deviation ΔV becomes substantially zero), the DC voltage converter circuits operate in synchronization with each other if the thresholds are set lower, whereby the starting time can be made shorter. By contrast, the starting time can be made longer by increasing the thresholds. The above-mentioned control apparatus can also be employed in AC/DC converters whose input voltages are AC signals.

FIG. 3A is a timing chart of the current I (load current Io and detected currents $I_{L1}$, $I_{L2}$), FIG. 3B is a timing chart of output voltage Vo, FIG. 3C is a timing chart of pulse driving signal $D_2$, and FIG. 3D is a timing chart of pulse driving signal $D_1$. in the circuit shown in FIG. 2.

As mentioned above, along with the drastic increase in load current Io after a time t1, the output voltage Vo decreases. In this case, the pulse driving signals $D_1$, $D_2$, which have been in reverse phases so far, attain the same phase, whereby the output voltage is seen to increase gradually.

As explained in the foregoing, the control apparatus in accordance with the above-mentioned embodiment is a control apparatus for a power supply apparatus comprising a plurality of power converter circuits connected in parallel; each power converter circuit comprising a switch circuit (2, 3) for forming a pulse-like waveform by switching an inputted power according to a PWM signal D, and a smoothing circuit (4, 5) for converting the pulse-like waveform into a direct current and outputting the direct current; the control apparatus comprising a feedback control unit (7a, 7b, 7e, 7f) for changing, according to the magnitude of an arithmetic value CS summing a proportion signal (kp×ΔV) in proportion to a deviation (ΔV) of an output voltage Vo of the power converter circuit from a reference voltage Vr and an integration signal (ki×∫ΔVdt) integrating the deviation ΔV, a duty ratio of the PWM signals D applied to switching devices 2, 3 of the power converter circuits; and a phase control unit (J1, J2, J3, 7g) for causing the PWM signals D to synchronize phases thereof when the proportion signal (kp×ΔV) or integration signal (ki×∫ΔVdt) exceeds its corresponding threshold PMAX, IMAX. The phase matching effected by the phase control units allows the power converter circuits to operate in synchronization, whereby the output voltage supplied to the load L can be restrained from decreasing remarkably.

The power supply apparatus regulated by the control apparatus of the present invention favorably follows the load current without making the control system unstable, and thus is excellent in the stability of output voltage.

What is claimed is:

1. A control circuit for a power supply apparatus comprising a plurality of power converter circuits connected in parallel; each power converter circuit comprising a switch circuit for forming a pulse-like waveform by switching an inputted power according to a pulse driving signal, and a smoothing circuit for converting the pulse-like waveform into a direct current and outputting the direct current;

the control circuit comprising a feedback control unit for changing, according to a magnitude of an arithmetic value summing a proportion signal in proportion to a deviation of an output voltage of the power converter circuit from a reference voltage and an integration signal integrating the deviation, a duty ratio of the pulse driving signals applied to switching devices of the power converter circuits; and a phase control unit for causing the pulse driving signals to synchronize phases thereof when the proportion signal or integration signal exceeds a threshold thereof.

2. A control circuit according to claim 1, wherein said threshold is variable.

3. A power supply apparatus comprising the control apparatus according to claim 1, wherein the plurality of power converter circuits are connected in parallel, and wherein the power converter circuits are controlled by the control circuit.

* * * * *